United States Patent [19]

Nelson

[11] Patent Number: 5,013,009
[45] Date of Patent: May 7, 1991

[54] TOP ENTRY VALVE
[75] Inventor: Donald R. Nelson, Worcester, Mass.
[73] Assignee: Goddard Valve Corporation, Worcester, Mass.
[21] Appl. No.: 389,637
[22] Filed: Aug. 4, 1989
[51] Int. Cl.[5] .............................................. F16K 3/12
[52] U.S. Cl. .................................... 251/357; 251/203; 251/328
[58] Field of Search ................ 251/203, 328, 357, 195
[56] References Cited

U.S. PATENT DOCUMENTS

| | | | |
|---|---|---|---|
| 653,600 | 7/1900 | Wiley | 251/203 |
| 1,645,785 | 10/1927 | Wilson | 251/203 |
| 3,398,926 | 8/1968 | Scaramucci | 251/328 X |
| 3,993,092 | 11/1976 | Still | 251/328 X |
| 4,163,544 | 8/1979 | Fowler | 251/328 |

Primary Examiner—John C. Fox
Attorney, Agent, or Firm—Wolf, Greenfield & Sacks

[57] ABSTRACT

A cryogenic gate valve having a body with a full passage formed therein. A gate has opposed faces at an acute angle with a recess formed in one face of the gate. The recess receives a sealing means that is comprised of a sealing ring having a base flange and an annular flange, and a rigid securing disk having a peripheral flange. The annular flange on the sealing ring has multiple concentric sealing ribs. The interface surface between the disk and the sealing ring extends at a taper angle to the face of the gate.

10 Claims, 2 Drawing Sheets

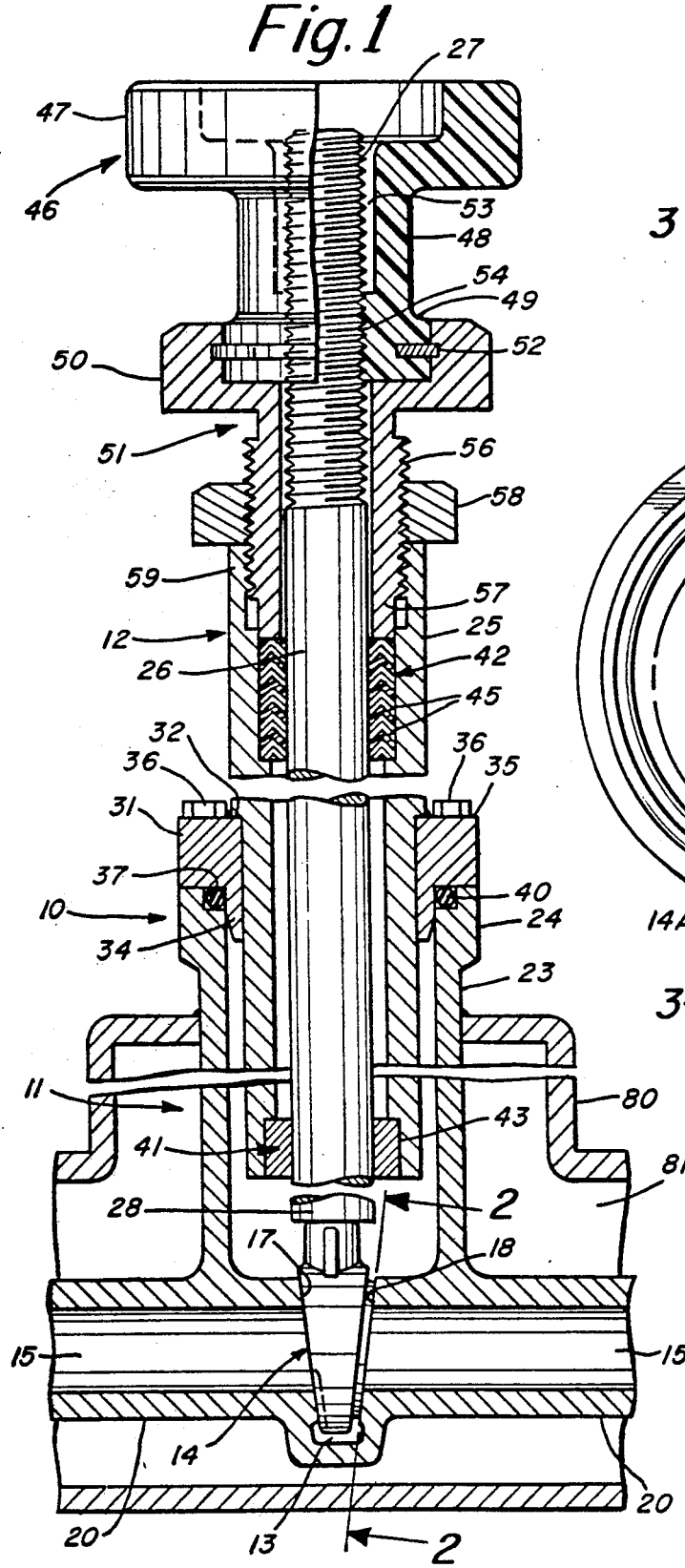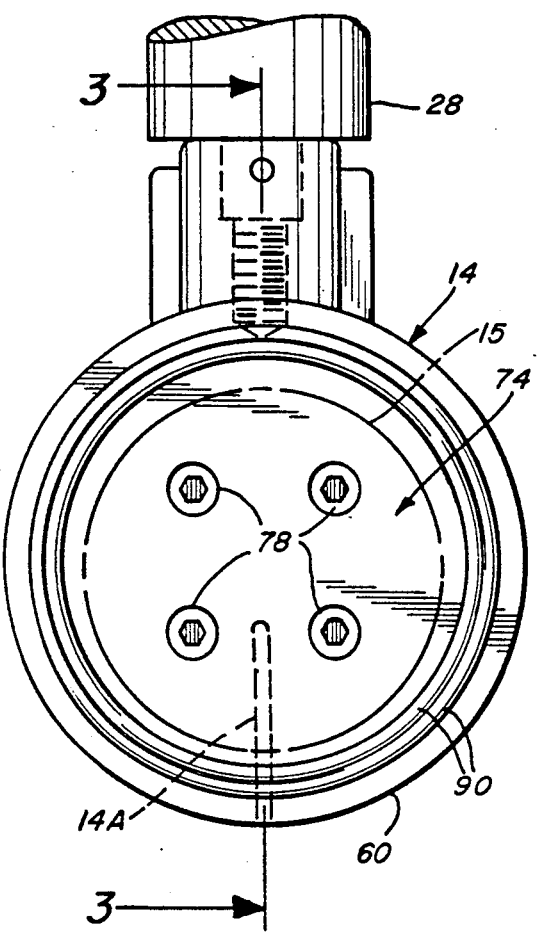

TOP ENTRY VALVE

BACKGROUND OF THE INVENTION

1. Field of the Invention

The present invention relates in general to top entry valves and pertains, more particularly, to an improved sealing arrangement for these types of valves.

2. Background Discussion

High performance valves, particularly those used at cryogenic temperatures require carefully fabricated gates and seats to assure proper closure of the valve without the likelihood of leakage. Because of the stringent requirements for such high performance valves, it is often necessary to have easy access to the gate and seats of the valve for repairs and other modifications. In this regard, refer to my previously granted U.S. Pat. No. 3,471,122, granted Oct. 7, 1969 for an illustration of a top entry valve that provides good accessibility to the valve components.

An object of the present invention is to provide an improved top entry valve.

Another object of the present invention is to provide an improved entry valve that may be constructed with an insulating cryogenic jacket for encapsulating the valve in a manner which permits access to the valve components without removal of the valve from the line. In such a construction the gate of the top entry valve is removable without destroying the jacket or without removing the body of the valve from the line.

Another object of the present invention is to provide an improved top entry valve with an improved valve seat construction.

A further object of the present invention is to provide an improved top entry gate valve particularly for cryogenic purposes and in which at least formed angular cross-sectioned deformable sealing member is carried by the gate and is adapted to engage a rigid seat in the valve.

SUMMARY OF THE INVENTION

To accomplish the foregoing and other objects, features and advantages of the invention, there is provided a top entry valve that has a body with a flow passage formed therethrough. In the flow passage there are defined a pair of aligned seat members with facing, annular surfaces lying in planes at an acute angle to one another. A sealing means is provided for at least one of the faces of the gate positioned within and projecting from a recess in that face. This sealing means is formed of a deformable material. The sealing means comprises an annular flange projecting from the one face of the gate and positioned to be uniformly engaged by the annular surface of one of the seat members. The flange projects on one side from this face. Means are provided for rigidly securing the annular flange to the gate against movement relative thereto including annular means having a tapered surface for engaging into the surface of the sealing means. The sealing means is furthermore provided at its annular flange with multiple annular contact surfaces.

BRIEF DESCRIPTION OF THE DRAWINGS

Numerous other objects, features and advantages of the invention should now become apparent upon a reading of the following detailed description taken in conjunction with the accompanying drawings, in which:

FIG. 1 is a side elevation cross-sectional view of a valve embodying the present invention;

FIG. 2 is a cross-sectional view taken along line 2—2 of FIG. 1;

DETAILED DESCRIPTION

Figure 3:
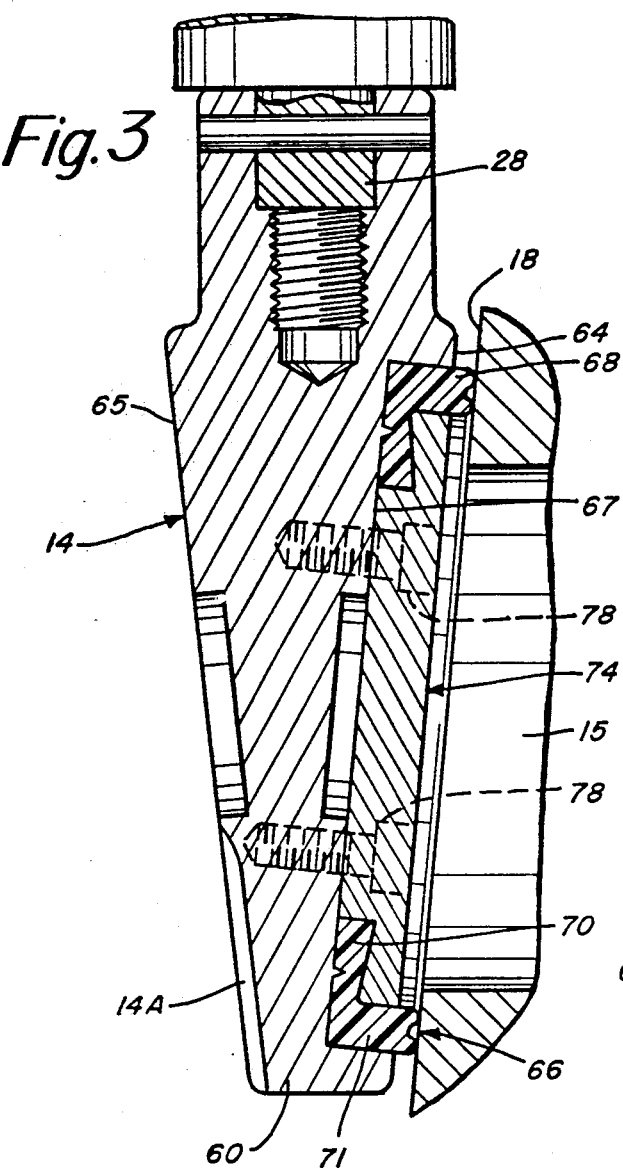
FIG. 3 is a cross-sectional view taken along line 3—3 of FIG. 2.

Although the invention is described in an embodiment of a top entry valve in combination with a vacuum jacket for cryogenic purposes, it should be understood that this is illustrative only of a preferred use and that the invention may be embodied in other valve constructions whether jacketed or unjacketed in which top entry access to the gate is desirable.

In the drawings illustrated herein, the top entry gate valve is illustrated with primarily single-sided seating. However, it is understood that the principles of the invention described herein may also be used in a top entry valve including opposed seats such as in the construction of U.S. Pat. No. 3,471,122.

The valve illustrated in the drawings herein includes a body member 10 having a body 11 and bonnet 12. Within the body 11 there is a chamber 13 which provides a flow passage through the body. The chamber 13 is shaped to receive a wedge or gate 14. Extending from the chamber 13 are aligned openings 15 formed by tubular extensions 20. These extensions are formed with outer ends adapted to be butt-welded to pipes of a system in which the valve is to be used. Alternatively, these extensions may be flanged and screwed to pipes of a system. The inner ends of these tubular extensions are formed with annular planar metal seats 17 and 18 extending at an acute angle to one another. The tubular extensions are integrally cast with a cylindrical upper end 23. This cylindrical upper end 23 terminates at its upper end in a rectangularly-shaped or cylindrically-shaped outwardly flared flange 24.

The bonnet 12 includes a stem tube 25 and a stem 26. The stem 26 is an elongated cylindrical member which is threaded at its upper end 27 and which extends well into the cylindrical upper end 23 of the body member 10 at its lower end 28. See FIG. 3 also. The wedge 14 is secured to the lower end 28 of the stem by suitable means such as, for example, illustrated in the more detailed cross-sectional view of FIG. 3 in which the attachment is carried out by a screw tight connection with associated cross-pinning as noted in FIG. 3.

The stem tube 25 through which the stem 26 extends, is secured to an upper opening in the cylindrical upper end 23 by a bonnet cap 31. The bonnet cap 31 is an annular flange through which the stem tube 25 projects. The cap 31 is closely fitted at a shoulder section 32 formed on the outer surface of the stem tube 25 intermediate its ends. The cap 31 has an inner sleeve portion 34 which fits closely to the outer surface of the stem tube 25 and which extends between the stem tube and the cylindrical upper end 23. The outer or upper end 35 of the cap 31 is rectangular in shape and is preferably dimensioned to the shape and size of flange 24. The flange 24 and outer end 35 of the cap 31 are secured together by screws 36. The extreme upper end of the cylindrical end 23 is formed with a counterbore 37 within which is positioned a sealing ring 40 with the ring 40 effectively sealing the junction between the cylindrical upper end 23 and the cap 31.

The stem 26 is journaled in spaced relation to the stem tube 25 at its ends by suitable journaling means 41 and 42. Journaling means 41 comprises an annular ring 43 which functions both as a bearing and as a restricting device. This ring 43 may be held in position by welding, force fit or by upsetting the bore formed on the inner surface at the lower end of the stem tube 25. The inner surface of the ring 43 is closely fit to and supports the stem 26 at its lower end. Preferably, as tight a fit as possible should be provided between the inner surface of the ring 43 and the stem 26 consistent with the ability to slide the stem 26 longitudinally with respect to the ring 43 on moving the handle controlling the stem 26, and without dislodging the ring 43 from he counterbore in the stem tube 25 at cryogenic or ambient temperatures.

The journaling means 42 comprises an annular packing of sealing material formed, for example, of Teflon of Graf-oil. This packing may comprise a series of annular rings 45 having a cross-sectional configuration in the shape of a V so that longitudinal compression of the stacked rings 45 will exert a sealing pressure inwardly toward the stem 26. These packing rings 45 are positioned within a counterbore formed on the inner surface of the stem tube 25 near its upper end.

The handle construction generally illustrated at 46 in FIG. 1 comprises a hand grip 47, a continuous shank 48, and a lower outwardly flared flange 49. The flange 49 is positioned within a recess in the upper outwardly extending flange 50 of the sleeve member 51. The flange 49 is freely rotatable within the flange 50 and is secured in this flange against axial movement by a retaining ring 52 which extends radially from the flange 49 into a recess within flange 50.

The shank 48 is formed with a longitudinally extending opening 53 which is threaded at its lower end 54. The lower end 57 of the sleeve member 51 has an outer diameter slightly less than the inner diameter of the stem tube 25. The threads 56 engage the threads of lock nut 58 and threads formed on the walls of a second engage the upper end of stem tube 25. Sleeve member 51 is threaded into the upper member of stem tube 25 where it is held in tight engagement by the lock nut 58 with the lower end 57 of the sleeve member in pressing engagement with the packing rings 45. Rotation of the hand grip 47 caused axial movement of the stem 26 thereby causing wedge 14 to move to and from a sealing position between the seats 17 and 18.

The valve may be formed of a variety of materials, but preferably, and for purposes of economy, the body members should primarily be formed of brass while the stem and stem tube are preferably formed of a stainless steel. The seat members 17 and 18 are preferably formed of a metal or deformable plastic material. The hand grip 47 may be formed of plastic, such as nylon; and the packing rings 45 may be also formed of a plastic, such as Teflon.

Reference is again made to the construction of the gate and seat as illustrated in greater detail in FIGS. 2 and 3. The gate 14 is generally wedge shaped in a front to rear cross section, as illustrated in FIG. 3. The sides of this wedge or gate 14 are tapered from a wide upper end downwardly to an arcuate lower end 60 as viewed in FIG. 3. The side walls may be channeled to receive projecting rails or guides formed in the body 11 to guide the gate in reciprocating vertical movement. Other suitable guide means may be used.

As noted in the cross-sectional view of FIG. 3, the gate 14 has opposite facing surfaces 64 and 65. Both of these surfaces may be provided with sealing means. However, in the particular embodiment described herein only the surface 64 is provided with this sealing means. The sealing means is generally illustrated at 66. To accommodate the sealing means 66, in the embodiment illustrated herein, the face 64 of the gate or wedge 14 is formed with a circular depression 67. As noted in FIG. 3, this depression has a larger diameter than that of the opening 15. Positioned within this depression is a seating means in the form of an annular, preferably plastic, sealing ring 68.

The sealing ring 68 may be formed of suitable plastic such Kel-F. This ring has an L-shaped cross-sectional configuration as illustrated in FIG. 3 with a base flange 70, and outwardly extending flange 71. These flanges are continuous and formed as an integral piece. The base flange 70 fits against the bottom of the depression 67 while the flange 71 fits closely against the side walls of formi..g the depression 67.

Figure 4:
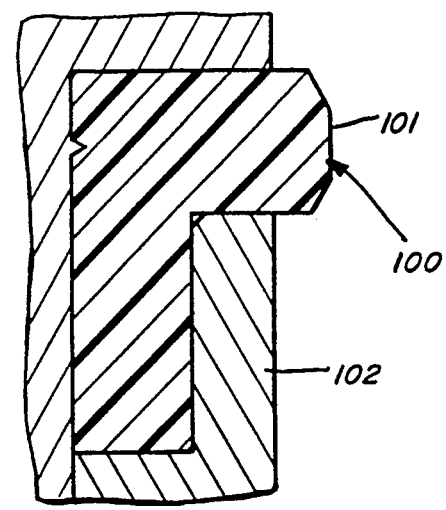
FIG. 4 is a fragmentary cross-sectional view of the configuration of the prior art sealing member.

Reference is now made to the cross-sectional view of FIG. 4 for an illustration of the prior art sealing ring 100. This is substantially of the type illustrated in U.S. Pat. No. 3,471,122 having a substantially curved sealing surface 101. FIG. 4 also shows the securing disk 102 as per the prior art.

Figure 5:
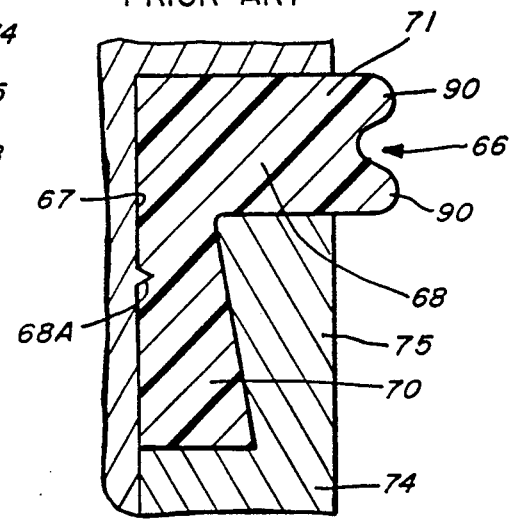
FIG. 5 is a fragmentary cross-sectional view of the sealing member in accordance with the present invention.

Now, in accordance with the present invention as illustrated in, for example, FIGS. 3 and 5, the sealing ring 68 is of improved construction. First, a more positive engagement is provided between the disk 74 and the sealing ring 68. This is carried out by the provision of a tapered interface between the peripheral flange 75 of the disk 74 and the base flange 70 of the sealing ring 68.

With regard to this tapering interlock, for the metal disk 74, the peripheral flange tapers to a greater thickness at its outer end in comparison. Similarly, the flange 70 tapers to a greater thickness at its inner end in comparison to its outer end adjacent to the flange 71.

The disk 74 is preferably constructed of a metal material and its peripheral flange 75 essentially conforms with the inner periphery of the sealing ring, being provided with an essentially stepped portion at the tapered interface for engagement with the flange 70. Again, refer to FIGS. 3 and 5.

The inner face of the disk 74 lies in facing relation with the bottom of the depression 67 while the outer surface of the disk 74 lies within the cylindrical-like chamber formed by the flanges 70 and 71. The metal disk 74 is secured to the wedge 14 by a plurality of cap screws 78 which project through counterbores in the metal disk 74 and into the wedge 14.

Stress razors 68A integrally formed as annular projections from the bottom of depression 67 bite into and secure the sealing ring 68. The wedge 14 is provided with a venting passage 14A in the face 65 as noted in FIG. 3. The vent passage 14A enables venting of the chamber 13 so as to prevent pressure buildup when liquidfied gases gasify.

Another feature of the sealing means of the present invention relates to the configuration of the annular flange 71. As noted in the enlarged cross-sectional view of FIG. 5, the flange 71 is provided with a pair of annular sealing ribs 90. Also refer to these ribs in FIG. 2. The multiple ribs provide a multiple concentric sealing surfaces so as to further enhance the sealing capabilities of the valve.

Figure 6:
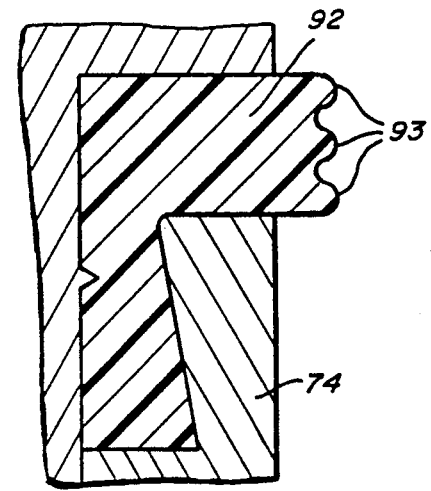
FIG. 6 is a fragmentary cross-sectional view of an alternate embodiment of the present invention.

Reference may also be made to the fragmentary cross-sectional view of FIG. 6 for an alternate embodiment, in particular, of the sealing ring. In this embodiment, the outwardly extending annular flange 92 instead of being provided with two ribs is instead provide with three ribs 93. Again, with this embodiment of the invention multiple annular sealing contact surfaces are provided. In this regard refer to the multiple contact points against the valve seat 18 as illustrated in FIG. 3.

Surrounding the valve construction and its associate components is a vacuum jacket 80 designed to insulate the valve mechanism. This vacuum jacket 80 may take any suitable form in which a chamber 81 is formed within the jacket 80 surrounding the valve and its components. This insulating jacket is suitably sealed to a vacuum system by butt welding annular ends to corresponding ends of parts in such a vacuum system.

Having now described a limited number of embodiments of the present invention, it should be apparent to those skilled in the art that numerous other embodiments and modifications thereof are contemplated as falling within the scope of the present invention as defined by the appended claims.

What is claimed is:

1. A gate valve having a body with a flow passage formed therein and comprising:
   a gate receiving means comprising a pair of aligned seat members with facing, annular surfaces lying in planes at an acute angle to one another,
   a gate having opposed faces lying at an acute angled to one another and having a recess within at least one of said faces,
   a sealing means for at least one of said faces positioned within and projecting from said recess,
   said sealing means comprising a sealing ring having an L-shaped cross-sectional configuration with a base flange and an outwardly extending flange, said outwardly extending flange having an annular seat engaging sealing surface defined by multiple concentric sealing ribs;
   a rigid securing disk for securing the base flange of said sealing ring to said gate against movement relative thereto,
   said rigid securing disk having a peripheral flange thinner than the rest of the rigid securing disk and engageable with the base flange of said sealing ring, said peripheral flange tapers from a minimum thickness outwardly to a maximum thickness;
   a securing bolt means for securing the disk and in turn the sealing ring in the gate recess.

2. A gate valve having a body with a flow passage formed therein, and comprising;
   gate receiving means comprising a pair of aligned seat members with facing, annular surfaces lying in planes at an acute angle to one another,
   a gate having opposed faces lying at an acute angle to one another and having a recess within at least one of said faces,
   a sealing means for at least one of said faces positioned within and projecting from said recess,
   said sealing means comprising a sealing ring having a base flange and an annular flange extending outwardly from the base flange, and a rigid securing disk having a peripheral flange,
   said peripheral flange tapers from a minimum thickness outwardly to a maximum thickness,
   the engaging interface surface between said disk peripheral flange and said sealing ring base flange extending at a tapered angle to the face of said gate to enhance securing of said sealing ring by said securing disk.

3. A gate valve as set forth in claim 2 including securing bolt means for securing the disk and in turn the sealing ring in the gate recess.

4. A gate valve as set forth in claim 2 wherein said rigid securing disk has said peripheral flange and a central part,
   said central part of the disk has a greater thickness than the peripheral flange thereof.

5. A gate valve as set forth in claim 2 wherein the base flange tapers from a minimum thickness adjacent the annular flange to a maximum thickness thereof.

6. A gate valve as set forth in claim 2 wherein said annular flange has an annular seat engaging sealing surface defined by multiple concentric sealing rings.

7. A gate valve as set forth in claim 6 wherein said sealing ribs define a recess therebetween, said ribs being concentrically spaced so as to define plural concentric sealing surfaces.

8. A gate valve having a body with a flow passage formed therein, and comprising;
   gate receiving means comprising a pair of aligned seat members with facing, annular surfaces lying in planes at an acute angle to one another,
   a gate having opposed faces lying at an acute angle to one another and having a recess within at least one of said faces,
   a sealing means for at least one of said faces positioned within and projecting from said recess,
   said sealing means comprising a sealing ring having a base flange and an annular flange extending outwardly from the base flange,
   and a rigid securing disk having a peripheral flange and a central part, said central part of said securing disk having a greater thickness than said peripheral flange,
   said peripheral flange tapers from a minimum thickness outwardly to a maximum thickness,
   the engaging interface surface between said disk peripheral flange and said sealing ring base flange extending at a tapered angle to the face of said gate to enhance securing of said sealing ring by said securing disk.

9. A gate valve as set forth in claim 8 wherein the base flange tapers from a minimum thickness adjacent the annular flange to a maximum thickness thereof.

10. A gate valve as set forth in claim 8 wherein said annular flange has an annular seat engaging sealing surface defined by multiple concentric sealing rings.

* * * * *